United States Patent
Kuta et al.

(10) Patent No.: US 11,526,626 B2
(45) Date of Patent: Dec. 13, 2022

(54) FACIAL ANONYMIZATION WITH CONSISTENT FACIAL ATTRIBUTE PRESERVATION IN VIDEO

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Yoav Hacohen, Jerusalem (IL); Amitay Nachmani, Modi'in-Maccabim-Re'ut (IL); Naama Antebi, Tel Aviv (IL); Matan Ben-Yosef, Korazim (IL); Or Gorodissky, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 364 days.

(21) Appl. No.: 16/926,310

(22) Filed: Jul. 10, 2020

(65) Prior Publication Data
US 2022/0012362 A1    Jan. 13, 2022

(51) Int. Cl.
*G06F 21/62* (2013.01)
*G06F 17/18* (2006.01)
(Continued)

(52) U.S. Cl.
CPC .......... *G06F 21/6254* (2013.01); *G06F 17/18* (2013.01); *G06N 3/04* (2013.01); *G06N 3/08* (2013.01)

(58) Field of Classification Search
CPC ....... G06F 21/6254; G06F 17/18; G06N 3/04; G06N 3/08
See application file for complete search history.

(56) References Cited

U.S. PATENT DOCUMENTS 6,278,791 B1    8/2001    Honsinger et al.
8,270,718 B2    9/2012    Drory et al.
(Continued)

FOREIGN PATENT DOCUMENTS

EP    3451209    3/2019
KR    102123248    6/2020
(Continued)

OTHER PUBLICATIONS

Jourabloo, Amin, Xi Yin, and Xiaoming Lu, "Attribute Preserved Face De-identification", May 31, 2015.
(Continued)

*Primary Examiner* — Viral S Lakhia
(74) *Attorney, Agent, or Firm* — Pearl Cohen Zedek Latzer Baratz LLP

(57) ABSTRACT

To consistently anonymize video, an identity-preserving encoder may be trained with a decoder to preserve identity information unique to an individual in an encoded space. The identity-preserving encoder may encode source video images of a source identity to generate identity-preserving encoded data representing the source identity. A de-identification engine may generate de-identifying encoded data representing a different target identity. A transformation may be generated based on a difference between the identity-preserving and de-identifying encoded data, representing swapping the source identity with the target identity. The identity may be consistently swapped from the source to target in the encoded space by applying the same transformation to the identity-preserving encoded data for the source images. The swapped identity encoded data may be decoded to generate consistently anonymized output images representing the non-identity information of the source images with the target identity, for all the output video images.

15 Claims, 7 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 9,105,119 | B2 | 8/2015 | Whitehill et al. |
| 9,798,290 | B2* | 10/2017 | Tsang .................. G03H 1/2286 |
| 10,478,127 | B2* | 11/2019 | Sampson ............... A61B 5/282 |
| 11,074,733 | B2* | 7/2021 | Petriv .................. G06N 3/0454 |
| 11,178,123 | B2* | 11/2021 | Soryal ............ H04N 21/234345 |
| 11,228,767 | B2* | 1/2022 | Hannuksela ......... H04N 19/159 |
| 2007/0236513 | A1 | 10/2007 | Hedenstroem et al. |
| 2010/0074525 | A1 | 3/2010 | Drory et al. |
| 2011/0123118 | A1 | 5/2011 | Nayar et al. |
| 2012/0177248 | A1 | 7/2012 | Shuster |
| 2012/0288166 | A1 | 11/2012 | Sun et al. |
| 2014/0328547 | A1 | 11/2014 | Whitehill et al. |
| 2015/0324633 | A1 | 11/2015 | Whitehill et al. |
| 2017/0301121 | A1 | 10/2017 | Whitehill et al. |
| 2017/0302661 | A1 | 10/2017 | Conell, II et al. |
| 2019/0188562 | A1 | 6/2019 | Edwards et al. |
| 2019/0238568 | A1 | 8/2019 | Goswami et al. |
| 2019/0332850 | A1 | 10/2019 | Sharma et al. |
| 2020/0097767 | A1 | 3/2020 | Perry et al. |
| 2020/0304802 | A1* | 9/2020 | Habi .................... G06N 3/0472 |
| 2021/0099433 | A1* | 4/2021 | Soryal ................ H04N 21/8166 |
| 2021/0195206 | A1* | 6/2021 | Hannuksela ........... H04N 19/30 |
| 2022/0067149 | A1* | 3/2022 | Guajardo Merchan .. G06N 3/08 |

FOREIGN PATENT DOCUMENTS

| | | |
|---|---|---|
| MX | 2014015326 | 3/2018 |
| WO | WO 2015/039084 | 3/2015 |
| WO | WO 2015/039086 | 3/2015 |
| WO | WO 2016/107651 | 7/2016 |
| WO | WO 2018/225061 | 12/2018 |
| WO | WO 2019/014487 | 1/2019 |
| WO | WO 2021/033183 | 2/2021 |

OTHER PUBLICATIONS

Perez, Victor Ernesto Alonso, "Face Recognition and De-Identification in the Frequency Domain", Dec. 31, 2016.
He, Z., Zuo, W., Kan, M., Shan, S., and Chen, X, "AttGAN: Facial Attribute Editing by Only Changing What You Want", Jul. 25, 2018.
Meden et al: "Face Deidentification with Generative Deep Neural Networks", Arxiv. Org, Cornell University Library, 201 Olin Library Cornell University Ithaca, NY 14853, Jul. 28, 2017.
Saheb Chhabra et al: "Anonymizing k-Facial Attributes via Adversarial Perturbations", Arxiv. Org, Cornell University Library, 201 Olin Library Cornell Universtiy Ithaca, NY 14853, May 23, 2018.
Search Report of EP Application No. 21 18 2966 dated Dec. 16, 2021.
Liang Du et al. "GARP-Face: Balancing Privacy Protection and Utility Preservation in Face De-identification" IEEE International Joint Conference on Biometrics, Clearwater, FL, 2014, pp. 1-8.
Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.
Meng et al. "Face De-identification for Privacy Protection" 2014 37th International Convention on Information and Communication Technology, Electronics and Microelectronics (MIPRO), Opatija, 2014, pp. 1234-1239.
Gross et al. "Face De-Identification" In: Senior A. (eds) Protecting Privacy in Video Surveillance, pp. 129-146, Springer, London.
Bitouk et el. "Face Swapping: Automatically Replacing Faces in Photographs" ACM Trans. Graph. 27, 3, Aug. 2008, pp. 1-8.
Muraki et al. "Anonymizing Face Images by Using Similarity-Based Metric" 2013 International Conference on Availability, Reliability and Security, Regensburg, 2013, pp. 517-524.
Chi et al. "Facial Image De-Identification using Identity Subspace Decomposition" 2014 IEEE International Conference on Acoustics, Speech and Signal Processing (ICASSP), Florence, 2014, pp. 524-528.
Gross, Ralph, et al. "Multi-pie." Image and Vision Computing 28.5 (2010): 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." arXiv preprint arXiv:1703.09387 (2017).
Das, Nilaksh, et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012.
Messer, Kieron, et al. "XM2VTSDB: The extended M2VTS database." Second international conference on audio and video-based biometric person authentication. vol. 964.1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N. et al. "Localizing parts of faces using a consensus of exemplars." IEEE transactions on pattern analysis and machine intelligence 35.12 (2013): 2930-2940.

(56) References Cited

OTHER PUBLICATIONS

Ramanan, Deva, and Xiangxin Zhu. "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Sendik "What's in a face? Metric learning for face characterization" Computer Graphics Forum, 2019.
Chi Hehua et al. "Face de identification using facial identity preserving features" Dec. 14, 2015.
International Search Report for App. No. PCT/IL2020/050907 dated Nov. 30, 2020.
International Search Report for App. No. PCT/IL2019/050993 dated Dec. 31, 2019.
European Search Report for App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005;17(2):232-43. Newton et al, Jan. 10, 2005.
European Search Report for Application No. EP20202094.7 dated Mar. 22, 2021.
Search Report for Application No. PCT/IL2020/051287 dated Mar. 25, 2021.
Search Report for Application No. PCT/IL2020/051291 dated Jan. 25, 2021.
Ren, Zhongzheng; Lee, Yong Jae; Ryoo. Learning to Anonymize Faces for Privacy Preserving Action Detection. Eprint arXiv:1803.11556, Jul. 26, 2018.
Letournel, Geoffrey; Bugeau, Aur?Lie; Ta, Vinh-Thong; Domenger, Jean-Philippe. Face De-identification with Expressions Preservations. International Conference on Image Processing (ICIP) 2015, Sep. 2015.
PCT Search Report for Application No. PCT/IL2020/051286, dated Mar. 18, 2021.
Justus Thies et al. "Face2Face: Real-time Face Capture and Reenactment of RGB Videos" CVPR2016, Jul. 29, 2020.
Naruniec et. al. "High-Resolution Neural Face Swapping for Visual Effects" vol. 39 No. 4 (2020).
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" arXiv preprint arXiv:1912.05566 Dec. 11, 2019.
Fried et al. "Text-based editing of talking-head video" ACM Transactions on Graphics vol. 38 Issue 4 Article No. 68, pp. 1-14, Jul. 4, 2019.

* cited by examiner

FACIAL ANONYMIZATION WITH CONSISTENT FACIAL ATTRIBUTE PRESERVATION IN VIDEO

FIELD OF THE INVENTION

Anonymizing the identity of people by obfuscating identifying information, such as, faces, in video applications.

BACKGROUND OF THE INVENTION

Modern Privacy by Design (PbD) methodologies and Privacy regulations such as General Data Protection Regulations (GDPR) restrict the use of images and video containing Personal Identifiable Information (PII). Accordingly, image "anonymizers" were developed to reduce or eliminate PII in images, such as, faces, hands, or body geometry, so that an individual's identity cannot be determined.

Conventional anonymizers include face-blurring, pixelization, and masking. However, these methods eliminate all facial attributes and identity information.

Deep fake-based anonymization swaps faces, but takes an impractical amount of time to train. For example, deep fake-based training typically takes up to 12 hours per face that is trained to be swapped.

Accordingly there is a need in the art for efficient and consistent face swapping that preserves the look or attribute information of the original face.

SUMMARY OF THE INVENTION

Embodiments of the invention solve the aforementioned longstanding problems inherent in the art by efficiently anonymizing video by swapping faces consistently across multiple frames in the video while preserving non-identifying attributes of the original face. In some embodiments of the invention, a device, system and method is provided for consistently anonymizing a source video. An identity-preserving encoder may be trained with a decoder to preserve identity information unique to an individual in an encoded space. The identity-preserving encoder may encode source images in a source video of a person with a source identity to generate identity-preserving encoded data representing the source identity information in the encoded space. A de-identification engine may generate de-identifying encoded data representing information for a target identity different than the source identity in the encoded space. An identity or face-swapping transformation may be generated based on a difference between the identity-preserving encoded data and the de-identifying encoded data, the difference representing the removal of the source identity information and the addition of the target identity information. The identity may be swapped from the source to the target in the encoded space by applying the same transformation to the identity-preserving encoded data for a plurality of source images causing the removal of the source identity information and the addition of the same target identity information for all of the plurality of source images. The swapped identity encoded data may be decoded to generate a plurality of output images representing the non-identity information from the plurality of source images and the same target identity, but not the source identity, information, for all the plurality of output images in an output video.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
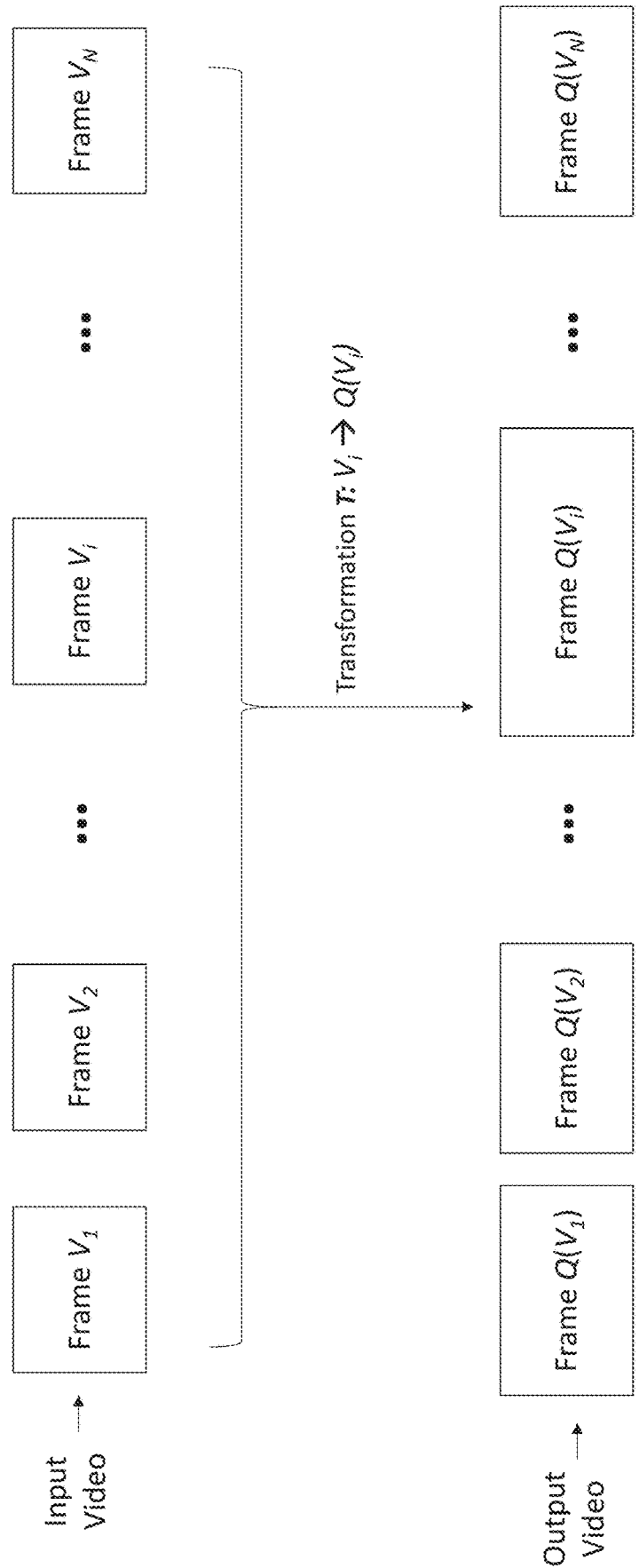
FIGS. 1A and 1B schematically illustrate a single face-swapping transformation (in FIG. 1A) or multiple face-swapping transformations (in FIG. 1B) for consistently swapping personal identifiable information of a real identity in a source video to the same synthetic (anonymous) identity in all images (FIG. 1A) or in multiple images (FIG. 1B) of an output video, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide a device, system and method to de-identify and remove or reduce facial attributes consistently across multiple images to uniformly anonymize faces in video.

A naïve approach to anonymize video may transform each different respective image independently in a video (e.g., based only on that single frame) to delete different and inconsistent personal identifiable information in each frame of the video. In contrast, embodiments of the invention use the same transformation T to anonymize multiple frames in a video (e.g., all video frames in FIG. 1A or a subset of multiple video frames in FIG. 1B). The face-swapping transformation T swaps faces or identities by adding a change in identity $\Delta z = (z2-z1)$ to the frames of the source video. This face-swapping transformation T adds the difference between a first encoding z1 of one or more frames depicting a real person to be anonymized in the source video and a second encoding z2 of one or more frames depicting an anonymous target identity. The face-swapping transformation T is trained to encode personal identity information (e.g., distance btw eyes, shape of nose, etc.), and not the individual frame information (e.g., facial expression, pose, lighting, background, clothes, etc.) so that it may be applied ubiquitously to all frames depicting the person to be anonymized. The personal identity information (and not the individual frame information) may be distilled by training a machine learning algorithm to identify a person or identity based on a substantially varied group of images of the person or identity, such that the commonality among them is the identity of the person in the training dataset, and not the remaining non-identity image data. Additionally or alternatively, the personal identity information may be distilled by averaging a sufficiently large number of frames depicting the person, thereby cancelling their differences (e.g., non-identifying information), while preserving their similarities (e.g., identifying information). The face-swapping transformation T may be applied to the frames after they are encoded in an encoded space where the encoder is trained to preserve identity information, but not remaining (non-identity) information in the frames (see e.g., FIG. 2). Additionally or alternatively, the face-swapping transformation T may be applied in the image space, to the images themselves, after averaging a sufficiently large number of images to reduce or minimize non-identity differences between frames.

By applying the same face-swapping transformation T to anonymize multiple video frames, the anonymizer swaps the personal identifiable information of the real identity in the source video with a synthetic identity consistently across those multiple frames in the output video. Thus, a real person in a source video is transformed to appear to be a different anonymous or synthetic target person in an output video, where the anonymous target output person appears to have the same identity in all images of the output video to which the same transformation is applied, e.g., regardless of differences between the output images. The output video thereby shows a de-identified person with a consistent identity.

A naïve approach for still image anonymization might be to perturb each output face independently per image. This however creates confusion in video applications because multiple video images are perturbed inconsistently in a different random way (e.g., warped in a different direction, mapped with a different transformation, blended with a different face, etc.). These random perturbations, on average, may cancel in the encoded space. For example, warping an initial face in different random directions about the original face results in an average of those perturbations that cancels. An attacker could thus use the average of the perturbations in the encoded space to reveal the original non-anonymized input face.

This problem may be solved according to embodiments of the invention, by using the same face-swapping transformation across multiple frames. Thus, the differences induced by the transformation are consistently (not randomly) distributed in the encoded space, and are thereby maintained (and do not cancel). Thus, the original non-anonymized input face remains hidden (and is not revealed).

Yet another advantage of embodiments of the invention is that applying the same face-swapping transformation to multiple images is more efficient for computer processors and memories than applying a different transformation to each different image. By reusing and reducing the number of transformations, embodiments of the invention eliminate or reduce duplicative computations and memory conventionally allocated to independently determining and storing a different transformation for each individual video frame. This computational and storage benefit grows proportionally to the number of frames to which the same transformation is applied, and so is particularly significant in video applications, which typically have thousands of image frames.

Figure 1B:
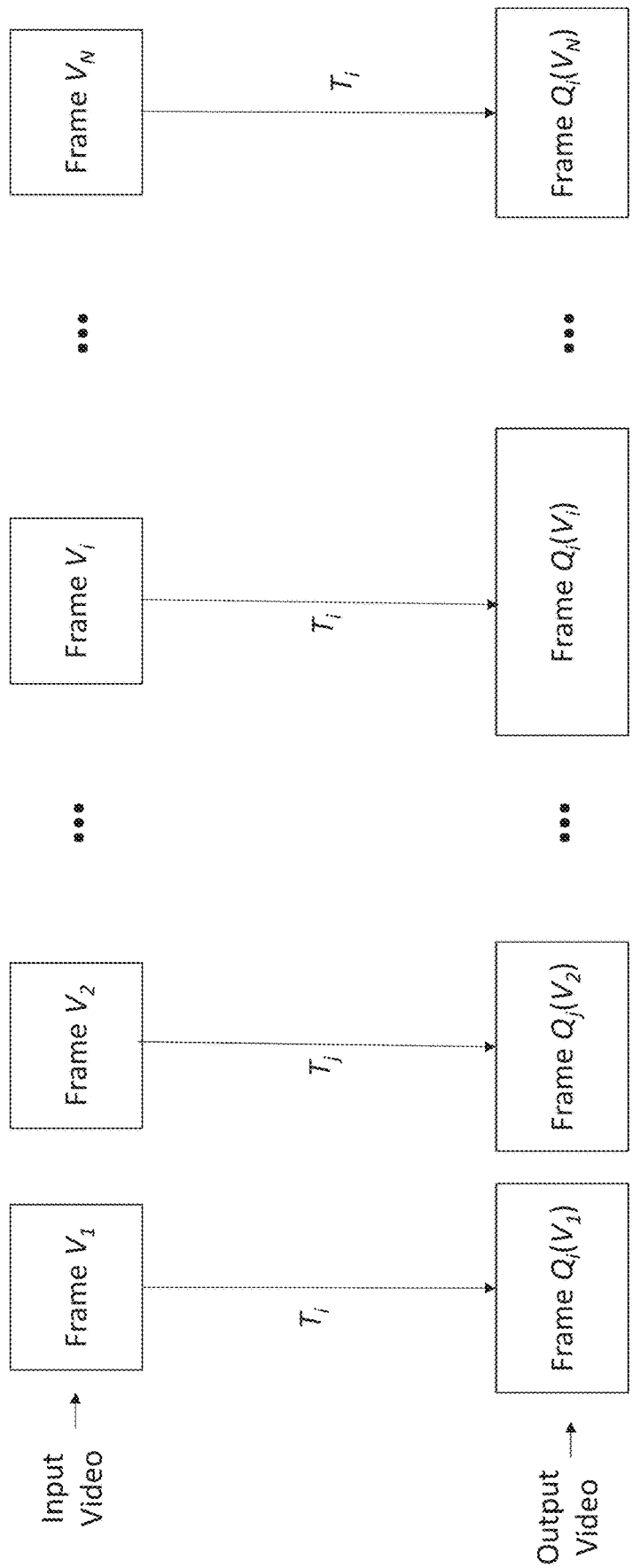

Reference is made to FIGS. 1A and 1B, which schematically illustrate a single face-swapping transformation (in FIG. 1A) or multiple face-swapping transformations (in FIG. 1B) for consistently swapping personal identifiable information of a real identity in a source video to the same synthetic (anonymous) identity in all images (FIG. 1A) or in multiple images (FIG. 1B) of an output video, in accordance with some embodiments of the invention.

Embodiments of the invention may store, retrieve and input a portion or entirety of a source or input video, V, to anonymize. Source video, V, may be captured by one or more video cameras (e.g., input device 7 of FIG. 5). Input video, V, may comprise a plurality of video image frames $\{V_2, \ldots, V_N\}$. At least a subset S of those frames depict scene(s) comprising one or more real people with personal identifiable information, such as, information about the appearance and/or geometry of their faces, hands, or bodies. Embodiments of the invention may initially anonymize one or more individual frames $V_i$ in S to be transformed into corresponding anonymous frames $Q(V_i)$, where, for example, $V_i$ is the i-th frame in the video V, frame i is in the subset of frames S with personal identifiable information, and Q is a frame anonymizer.

Anonymizer Q may remove, reduce, or obscure some or all personal identifiable information of a source identity (e.g., encoded in a first encoding z1 of one or more frames depicting the real source person), so that the source identity cannot be identified, or can be identified with less certainty. Anonymizer Q may swap the source identity PII (e.g., encoded in z1) with a new target anonymous synthetic identity PII (e.g., encoded in z2) in all frames. The frame anonymization Q from input to output frame(s) may be one-to-one (e.g., a single input frame, $V_i$, is anonymized to a single anonymized output frame, $Q(V_i)$), many-to-one (e.g., multiple input frames, $V_i, V_j, V_k$, are anonymized to a single anonymized output frame, $Q(V_i, V_j, V_k)$), one-to-many (e.g., a single input frame, $V_i$, undergoes multiple anonymizations by multiple different respective encoders or anonymization methods $Q_1(V_i), Q_2(V_i), Q_3(V_i)$, or many-to-many (e.g., multiple input frames, $V_i, V_j, V_k$ collectively mapped to multiple output frames, $Q(V_i), Q(V_j), Q(V_k)$). In a one-to-many or many-to-one mapping, the multiple (many) frames may be combined into a single frame to maintain a constant video stream rate (e.g., by averaging or by selecting an optimal frame, such as the most stable frame or anonymizer across multiple frames or anonymizers). Additionally or alternatively, the video stream rate in a one-to-many or many-to-one mapping may be increased (e.g., replacing one frame with multiple frames) or decreased (e.g., replacing multiple frames with one frame), respectively.

Face-swapping transformation $T_i$ from $V_i$ to $Q(V)$ may be computed by adding a difference $\Delta z$ (e.g., average of pixel-to-pixel differences, average of vectors in an encoded space generated by an autoencoder, etc.), corresponding to a change in identity, to the input frame(s) $V_i$ to generate output frame(s) $Q(V_i)$. Like anonymizer Q, the face-swapping transformation Ti may also have a one-to-one, one-to-many, many-to-one, or many-to-many relationship with input frame(s) $V_i$ and/or anonymized frame(s) $Q(V_i)$. The face-swapping transformation $T_i$ from the original source video frame $V_i$ (with a source person's PII encoded in z1 intact) to the anonymized video frame $Q(V_i)$ (with the source person's PII encoded in z1 eliminated or reduced, and replaced by a different synthetic target identity PII encoded in z2) represents the deletion of the source person's PII encoded in z1 and the addition of the anonymous target person's PII encoded in z2. The transformation $T_i$ may be applied in an encoded image space where the encoder is trained to preserve identity information (e.g., facial landmarks or other biometric data), but not trained to preserve non-identity information (e.g., lighting, background, etc.), e.g., as described in reference to FIG. 2. In this way, the encoded space is trained to distill the identifying information of images (and excludes the non-identifying information of images). To maintain consistency across the frames in video V, instead of using a different transformation for each frame as in conventional systems, embodiments of the invention may use the same transformation, e.g., $T(x)=T_i(x)=x+\Delta z=x+(z2-z1)$, that is generated to anonymize one or more input frame(s), $V_i$, to anonymize one or more additional different input frames, $V_p$, $i \neq p$, in video V.

In one embodiment shown in FIG. 1A, a single face-swapping transformation $T=T_i$, is used to anonymize all input frames $V_1, \ldots, V_N$ in video V or in the video subset S featuring the same person. In another embodiment shown in FIG. 1B, multiple (two or more) different transformations $T_i$ and $T_j$ (for different respective anonymizers $Q_i$ and $Q_j$) are used to anonymize multiple (two or more) different groups of input frames in video V or video subset S. Additionally or alternatively, multiple transformations may be applied to the same multiple frames and the transformation outputs may be averaged or otherwise combined. Using the same single transformation T to anonymize all input frames in FIG. 1A may yield a maximum (or relatively greater) consistency in the person's appearance across the output anonymized video frames. For minimum (or relatively lower) consistency according to embodiments of the invention (but still more consistent than independently computing an anonymizer for each single frame), the same transformation is applied to at least two different frames, where the transformation generated for one frame (or a combination of one group of frames) is applied to another second frame (or a combination of another second group of frames), and where the transformation for the other frame would otherwise be different if independently determined for the other frame by the same method applied to the one frame. An intermediate level of consistency is achieved in FIG. 1B by applying the same transformation $T_i$ to an intermediate number of different frames (e.g., groups of three or more, such as, 10, 100, 1,000), but not all frames (see e.g., different transformation $T_j$ applied to frame $V_2$).

In some embodiments, different face-swapping transformations $T_i$ and $T_j$ may be used to transform frames with different object types or categories, including e.g., different people, perspectives, fields of view (FOVs), facial expressions (mouth open vs. closed, or smiling vs. frowning), body parts (face vs. hand vs. body), motions (e.g., walking vs. riding a bicycle). Different transformations may be generated based on different single or combinations of captured frames, or may be generated by artificially editing another transformation or another frame used for another transformation (e.g., a frown transformation or image may be artificially generated from a smile transformation or image). The anonymizer $Q_i$ may be selected or determine based on the object type(s) or category(ies) in an image and then the corresponding transformation $T_i$ may be applied. When multiple object type(s) or category(ies) (e.g., multiple people) are identified in a single frame, multiple corresponding transformations may be applied to each respective image region having that object type or category.

To address discrepancies among images attributed to non-identity information, such as different perspectives, orientations or fields of view (FOV), an encoder (e.g., 101 in FIG. 2) may transform the images to an encoded space that is trained to preserve identity (e.g., facial landmarks), but not trained to preserve (or trained to ignore) non-identity information. The encoded space thus reduces or eliminates all non-identity information and preserves only the identity information. The same face-swapping transformation may thus swap identity information consistently across all images in the encoded space, irrespective of their different non-identity information in the image space.

In various embodiments, the one or more transformations $T_i$ used to anonymize source video V may be selected that correspond to random frame(s) $V_i$, an average of frames, or optimal frame(s) $V_i$(e.g., with optimal image quality, face visibility, consistency between frames, etc.), or that are optimal transformation(s) $T_i$ (e.g., most consistent among a plurality of tested transformations, smallest difference between frame input Vi and anonymized frame Q(Vi), etc.), or that satisfy other selection or preference parameters. For example, a plurality of different Ti's may be tested (e.g., using a best-fit or least squares difference measurement or by machine learning) and the best fit one (or more, or average thereof) may be used.

Various types of anonymizers Q may be used according to embodiments of the invention. In one embodiment, anonymizer Q may be applied in an encoded space using an autoencoder, e.g., as described in reference to FIG. 2. In some embodiments, the autoencoder has two encoders and one decoder. One identity-preserving encoder may be trained to fully reconstruct an image—including identity, while the other de-identification encoder may be trained to preserve only non-identifying attributes, e.g. expression, lighting, gender, age, hair color, etc. but not identity information. A difference between the identity-preserving encoder and the de-identification encoder may yield a change in identity $\Delta z$ from the source identity to a new anonymized identity. Additionally or alternatively, the de-identification encoder may apply a perturbation to induce errors or perturbations in the encoded space (e.g., a reduced-dimensional intermediate layer of a neural network). Perturbations may target specific identifiable features (e.g., facial geometry, such as, by moving or rescaling eyes, nose, and/or mouth on a face), while preserving non-identifiable attributes (e.g., expression, lighting, coloring, etc.). Additionally or alternatively, anonymizer Q may be a search engine of a database of pre-computed anonymous target images, that inputs a source video frame depicting a person and outputs an anonymous frame of an anonymized or artificial person with the closest matching features, e.g., facial expression, hair and eye color, etc. (e.g., detected by a smallest difference algorithm or by machine learning to match identities). Additionally or alternatively, anonymizer Q may be a combination autoencoder and search engine, which encodes an input image, perturbs the encoded image in the encoded space, decodes a perturbed image and searches the precomputed database for a closest match to the person in the perturbed image. Other anonymizers Q may be used.

Various types of face-swapping transformations T may be used according to embodiments of the invention. In one embodiment, transformation T may be generated based on an average of pixel-to-pixel differences between input frame(s) $V_i$ and output frame(s) $Q(V_i)$, for example, as $T(x)=x+\text{mean}(Q\ (V_i)-V_i)$. Additionally or alternatively, transformation T may be a trainable model that maximizes a difference of face recognition, while minimizing a difference of image similarity, for example, by maximizing T=argmax[similarity(Q(V$_i$), T(V$_i$))]. Other transformations T may be used.

In some embodiments, multiple transformations Ti generated for multiple different frames Vi may be combined, e.g., by selecting an optimal one or more or by averaging. The average may be weighted, e.g., giving higher weights to frames that are more common, better quality, more consistent, etc.

In some embodiments, when there are a plurality of N people in an image frame, multiple transformations Ti generated for the multiple different people may be applied, for example, for different spatial regions of those respective different people in a single frame.

Autoencoders are often lossy, resulting in a loss of information, such as facial identity information, for frames processed by the autoencoder. A naïve application of autoencoders to anonymize images would fail for video applications because personal identifiable information would be lost in a potentially different way for each frame independently run through the neural network, so the appearance of the resulting output face would vary from image-to-image. Further, when the encoder warps each image in a different random way or direction, each output face differs from the input face differently, and on average all the differences may (partially or completely) cancel.

According to embodiments of the invention, a new autoencoder is provided that anonymizes personal identifiable information consistently across multiple image frames of a video.

Figure 2:
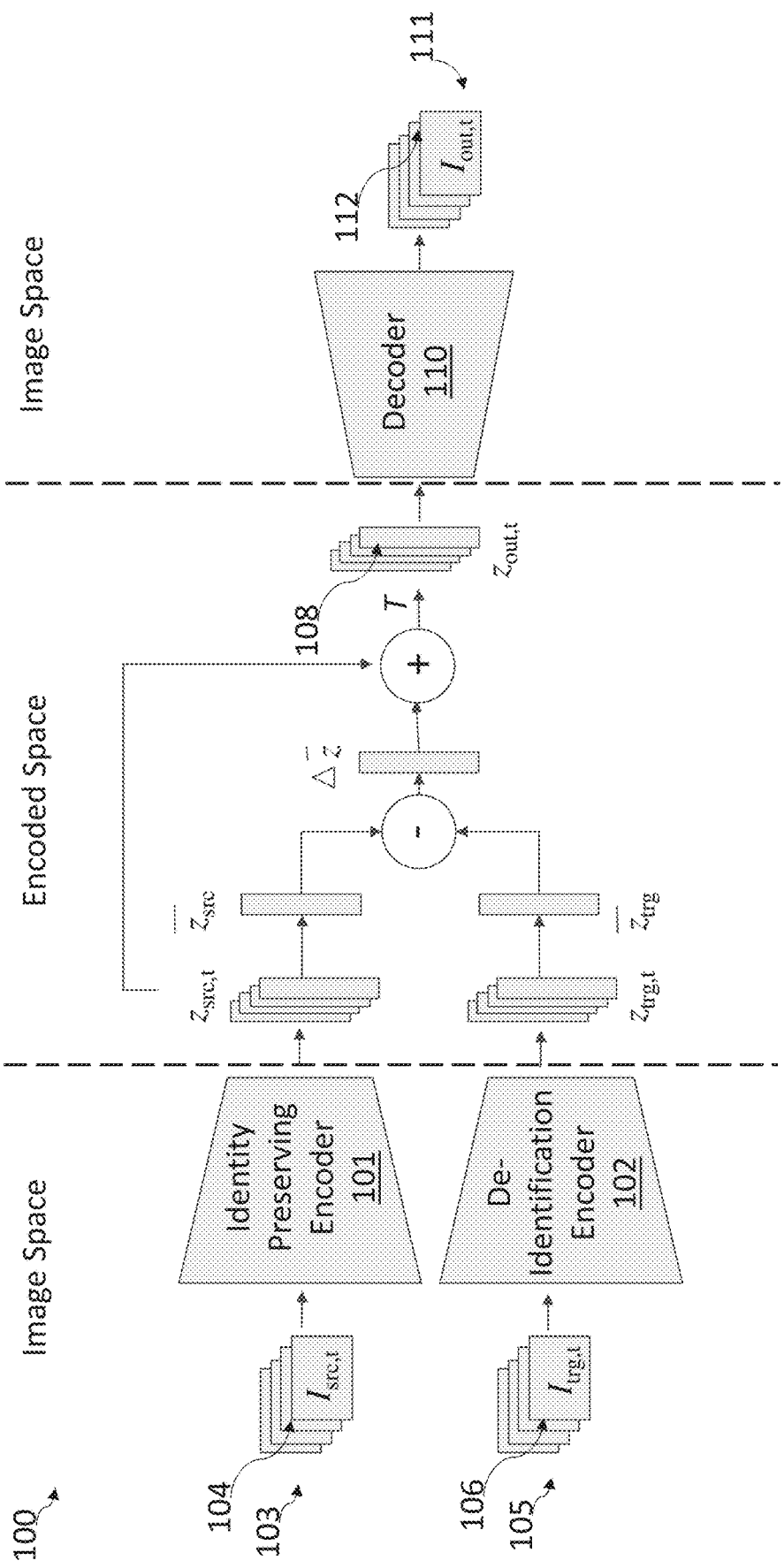
FIG. 2 schematically illustrates an autoencoder for anonymizing personal identifiable information consistently across multiple images of a source video, in accordance with some embodiments of the invention.

Reference is made to FIG. 2, which schematically illustrates an autoencoder 100 for anonymizing personal identifiable information consistently across multiple image frames 104 of a source video 103, in accordance with some embodiments of the invention.

The source or input video 103 to be anonymized incudes a plurality of source images 104. Source images 104 may be real images recorded by a camera or recording device (e.g., input device 7 of FIG. 5) that capture a real person's face or other identifying feature. Each source (src) image 104 is recorded at a different time t, denoted Isrc,t. The source video 103 may be anonymized by swapping the source identity of the person in source images 104 for a different target identity, e.g., in one or more target images 106. The target identity may be an anonymous or synthetic identity that does not represent a real person or whose permission is granted. In some embodiments, target images 106 may be selected from an anonymous image database by matching the target identity to the source identity in each frame 104, e.g., using mean-based logic described in reference to FIG. 3 or matched-geometry logic described in reference to FIG. 4. Additionally or alternatively, the target identity may be obtained by processing the source images themselves, e.g., by eliminating, reducing, or modifying identifying information therein. The original source identity and the de-identified target identity may have similar attributes and appear similar to the human eye, but are recognized as different and distinct identities to a facial recognition engine. The target (trg) image 106 matched to source image Isrc,t 104 is denoted Itrg,t.

Autoencoder 100 may be an artificial neural network comprising an identity-preserving encoder 101, a de-identification encoder 102, and a decoder 110. Encoders 101 and 102 may transform source images 104 from an image space (an input layer of dimension N) to an encoded space (one or more intermediate or hidden layer(s) of dimension M, where the dimension of the input layer N is greater than the dimension of the intermediate layer(s) M (N>M)). Any number and/or dimension(s) of intermediate layer(s) may be used in the neural network. Face-swapping transformation T may be applied in the encoded space to generate anonymized encoded image data. After anonymization in the encoded space, decoder 110 decodes and/or decompresses the M dimensional intermediate layer(s) of the encoded space, e.g., increasing its dimension from M back to N, to generate output anonymized images 112 as the neural network output layer in the image space. The output anonymized images 112 represent similar images with different identities than the source images 104. Because the input face's identifiable features are lost or reduced by the face-swapping transformation T, the output face is de-identified.

Identity-preserving encoder 101 inputs source images Isrc,t 104 in an image space (e.g., as image data) and encodes them to generate corresponding encoded source image data Zsrc,t in an encoded space (e.g., as vector data). Identity-preserving encoder 101 and decoder 110 are trained to match input and output images. Identity-preserving encoder 101 thereby preserves the identity information of the input image in encoded source image data Zsrc,t.

De-identification encoder 102 generates encoded target image data Ztrg,t encoding image data of the same target identity in the lower-dimensional encoded space (e.g., as vector data). De-identification encoder 102 may generate encoded target image data Ztrg,t in a variety of ways:

1. De-identification encoder 102 inputs and encodes target images Itrg,t 106 having a target identity that is different than, but most closely matches, the source identity in source images 104, as shown in FIG. 2. Target images Itrg,t 106 may be obtained from a pre-computed database of anonymous images (e.g., storage system 6 of FIG. 5). De-identification encoder 102 may be trained to preserve all the image information including the target identity information in the encoded data Ztrg,t. In this embodiment, the same (or different) one or type of encoder may be used for identity-preserving encoder 101 and de-identification encoder 102.

2. De-identification encoder 102 inputs and encodes source images Isrc,t 104 and is trained to preserve only non-identifying attributes (e.g. expression, lighting, gender, age, hair color, etc.) but not identifying attributes (e.g., facial landmarks). In this way, the identity of the source is lost and converted to a different target identity. In this embodiment, different encoders are used for identity-preserving encoder 101 (trained to preserve identity) and de-identification encoder 102 (trained to modify identity).

3. De-identification encoder 102 inputs and encodes source images Isrc,t 104, trained to preserve all information including the source identity information, and subsequently perturbs the encoded source image data Zsrc,t in the encoded space to generate encoded target image data Ztrg,t.

Encoding in a lower-dimensional encoded space aligns data from target images Itrg,t and source images Zsrc,t, e.g., in perspective, field of view, pose, etc.

Figure 3:
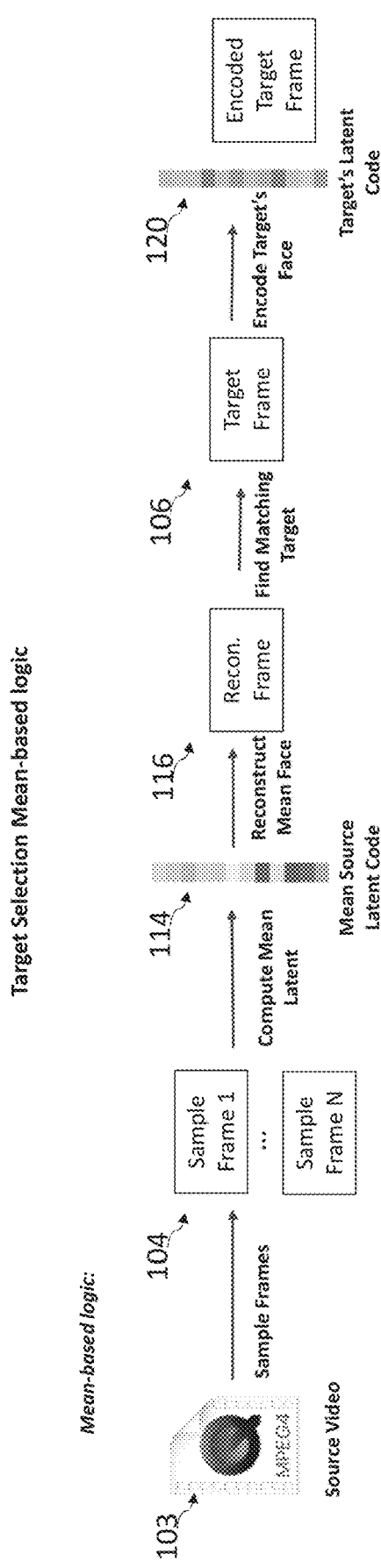
FIG. 3 schematically illustrates data structures for selecting a target anonymized image that matches an average of a source video using mean-based logic, in accordance with some embodiments of the invention.

In some embodiments of option (1) where the selected target and source images are not matched to have the same facial geometries, e.g., as in FIG. 3, the encoded data may be averaged to cancel or reduce the impact of variations from each individual frame, so that the average (or aggregate) encodes data representing the identity of the imaged individual (the information that does not change from frame to frame). Encoded source image data Zsrc,t may be averaged (or otherwise aggregated) over all (or a plurality of) indices or times t to generate an average (or aggregate) of the encoded source image data $\overline{Zsrc}$ in the lower-dimensional encoded space. Similarly, the encoded target image data Ztrg,t may be averaged (or otherwise aggregated) over all (or a plurality of) times t to generate an average (or aggregate) of the encoded target image data $\overline{Ztrg}$ in the lower-dimensional encoded space. Because averaging (or aggregating) reduces individual frame variations and distills commonalities across frames, e.g., the identity of the imaged individual, the average (or aggregate) encoded source image data $\overline{Zsrc}$ represents the source identity and the average (or aggregate) encoded target image data $\overline{Ztrg}$ represents the target identity. Additionally or alternatively, $\overline{Ztrg}$ may be generated by initially encoding $\overline{Zsrc}$ with identity-preserving encoder 101, decoding $\overline{Zsrc}$ with decoder 110, and re-encoding it with non-identity preserving de-identification encoder 102. In other embodiments of option (1) where the target and source images are matched to have the same facial geometries, e.g., as in FIG. 4, the averaging step may be skipped, since the matching geometries in the source and target encoded data will cancel or reduce each other.

The difference $\Delta \overline{Z}$ between the source and target averages, $\overline{Zsrc}$ and $\overline{Zsrc}$ (e.g., without geometry-matching in FIG. 3) or the source and target encoded data Zsrc,t and Ztrg,t (e.g., with geometry-matching in FIG. 4), thus represents swapping identities by eliminating the source identity and adding the target identity. This identity swap $\Delta \overline{Z}$ is applied using the same face-swapping transformation T(x)=x+(Zsrc,t+$\Delta \overline{Z}$) for all (e.g., in FIG. 1A) or a plurality (e.g., in FIG. 1B) of the original encoded source image data Zsrc,t to generate all output encoded image data Zout,t 108 with the same target identity. Each output encoded image data Zout,t 108 thus has the non-identity encoded image details of the source Zsrc,t, but with the identity swapped from the source identity to the same target identity by the same face-swapping transformation T.

Because autoencoder 100 anonymizes all or many images, not randomly, but by isolating and swapping the source identity information for identity information of a particular target identity by the same face-swapping transformation T, each image is anonymized in a consistent manner. By de-identifying facial attributes consistently across multiple images in video, embodiments of the invention provide an output video in which a person appearing across multiple images of the video will have a different (anonymous) face than the input face, but have substantially the same appearing face across the multiple video images. Further, because such embodiments do not add noise or error randomly, but by swapping the same identifiable information across all images, the anonymization is consistent across images and does not cancel when averaged, so that the original person is not revealed when streaming the sequence of images as a video.

In some instances, de-identification encoder 102 may not only remove identifiable facial information, but may inadvertently induce additional random unintended errors. For example, de-identification encoder 102 may remove certain facial markings (intended), but may also cause the person's mouth to open (unintended). In some embodiments, such random unintended errors may be reduced or eliminated by averaging encoded image data, e.g., Zout,t 108, for a plurality of N anonymized frames. Additionally or alternatively, a plurality of N anonymized output images 112 may themselves be averaged as a single or multiple (duplicative) output image(s) in the output video 111. Additionally or alternatively, the difference vector for a plurality of N anonymized images of the same input person may be averaged and cancelled from each frame in a video stream. While averaging may significantly reduce or cancel random unintended errors (ideally averaging to zero), it does not significantly reduce or cancel the removal of the personal identifiable information since this is encoded consistently throughout the images.

After the identity data is swapped in the encoded space, decoder 110 may decode each output encoded image data Zout,t 108 from the lower-dimension encoded space (intermediate neural network layer) back to an output image Iout,t 112 in the higher-dimensional image space (N dimensional output layer). The result is an output video 111 comprising a plurality of output images Iout,t 112 depicting the non-identifying information of the source images 104 with the target identity that is different than the source identity, but is the same consistent identity generated by the same transformation T across all output images 112.

Because face-swapping transformation T swaps identities in the encoded space, in some embodiments, multiple transformations may be sequentially applied to iteratively move between a sequence of identities. For example, a source video with a first identity may be mapped to a second identity (e.g., by adding $\Delta \overline{Z}1$ to the encoded first identity image data), which in turn may be mapped to a third identity (e.g., by adding $\Delta \overline{Z}2$ to the encoded second identity image data), and so on, achieving many different identities without re-transforming the original source video.

In some embodiments, identity preserving encoder 101 may be trained to preserve identities by optimizing the weights w of the decoder D and/or encoder E(x) using machine learning, e.g., by optimizing the objective function:

$$\mathrm{argmin}_w \Sigma_x d(D(E_w(x))-x) \quad (1)$$

where x is an input image, $E_w$ is the candidate encoder with the set of weights w, and d is a distance or difference function. This function trains identity preserving encoder 101 to encode data that is decoded to generate an image that most closely match the input image x, thereby preserving all image information including identity information. Any distance function d may be used, such as, e.g., the $L_2$ norm, d(a, b)=$\|a-b\|^2$, an angle between encoded vectors, or other differences.

Additionally or alternatively, de-identification encoder 102 may be trained to preserve non-identifying attributes A by optimizing decoder D and/or encoder E(x) using machine learning, e.g., by optimizing the objective function:

$$\mathrm{argmin}_w \Sigma_x d(A(D(E_w(x)))-A(x)) \quad (2)$$

where A is a non-identifying attribute function. This function trains de-identification encoder 102 to encode data that is decoded to generate an image that has non-identifying attributes A that most closely match that of the input image A(x), thereby preserving non-identifying attributes A, but not identifying information. Any distance function d may be used, such as, e.g., the $L_2$ norm, d(a, b)=$\|a-b\|^2$, an angle between encoded vectors, or other differences.

Reference is made to FIG. 3, which schematically illustrates data structures for selecting a target anonymized image that matches an average of a source video 103 using mean-based logic, in accordance with some embodiments of the invention. The selected target image may be the Itrg,t 106 input to FIG. 2.

Figure 5:
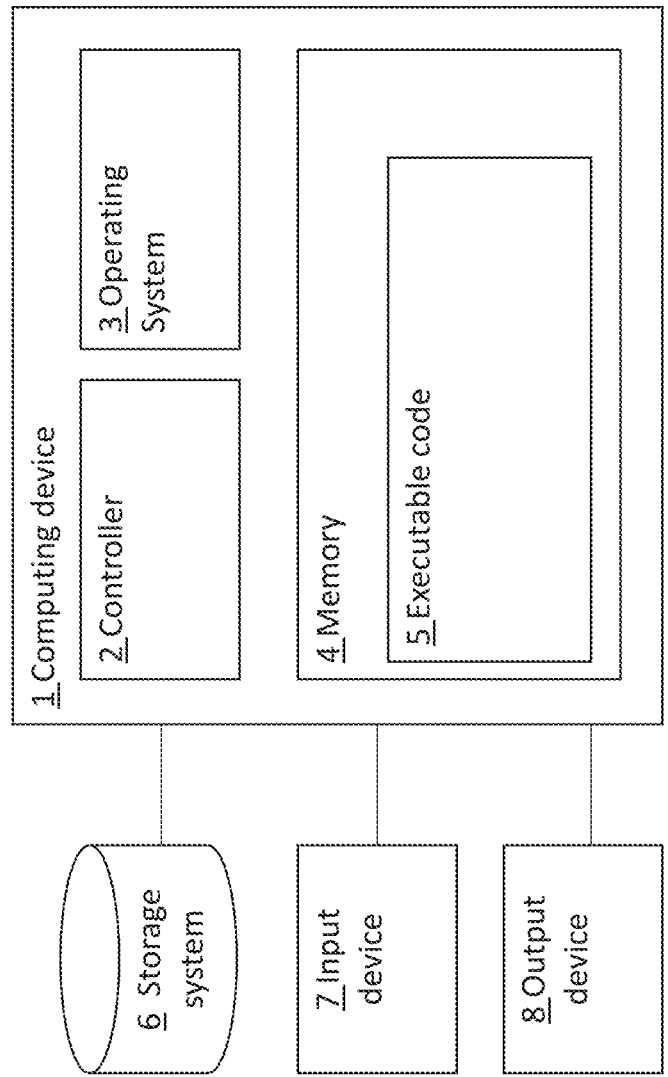
FIG. 5 schematically illustrates a system for anonymizing personal identifiable information consistently across multiple images of a source video, in accordance with some embodiments of the invention.

A source video 103 is recorded, obtained or retrieved from memory (e.g., memory 4 or storage system 6 of FIG. 5). One or more sample frames 104 are selected from the source video 103, e.g., based on an optimization (such as, image clarity), maximizing variety (such as, of perspectives or facial expressions), periodically (per index or time), and/or randomly. In other embodiments, all source video 103 frames may be selected. The selected frames 104 may be encoded, e.g., by encoder 101. The selected frames' mean latent value, such as, $\overline{Zsrc}$, may be computed to generate mean source latent code 114. The mean source latent code 114 may be decoded, e.g., by decoder 110, to reconstruct an image 116 of the mean face or image. The reconstructed (mean face) image 116 is compared against each of a plurality of candidate target images, e.g., from an anonymous face database, and the closest matching target image Itrg,t 106 (and/or its associated video may be target video 105) is selected, e.g., as input to FIG. 2. Each comparison may use a single candidate target image or an average of faces in a target video. The matching target image Itrg,t 106 (or video) may be encoded to generate encoded target image data Ztrg,t (or $\overline{Ztrg}$) 120, e.g., input into FIG. 2.

Figure 4:
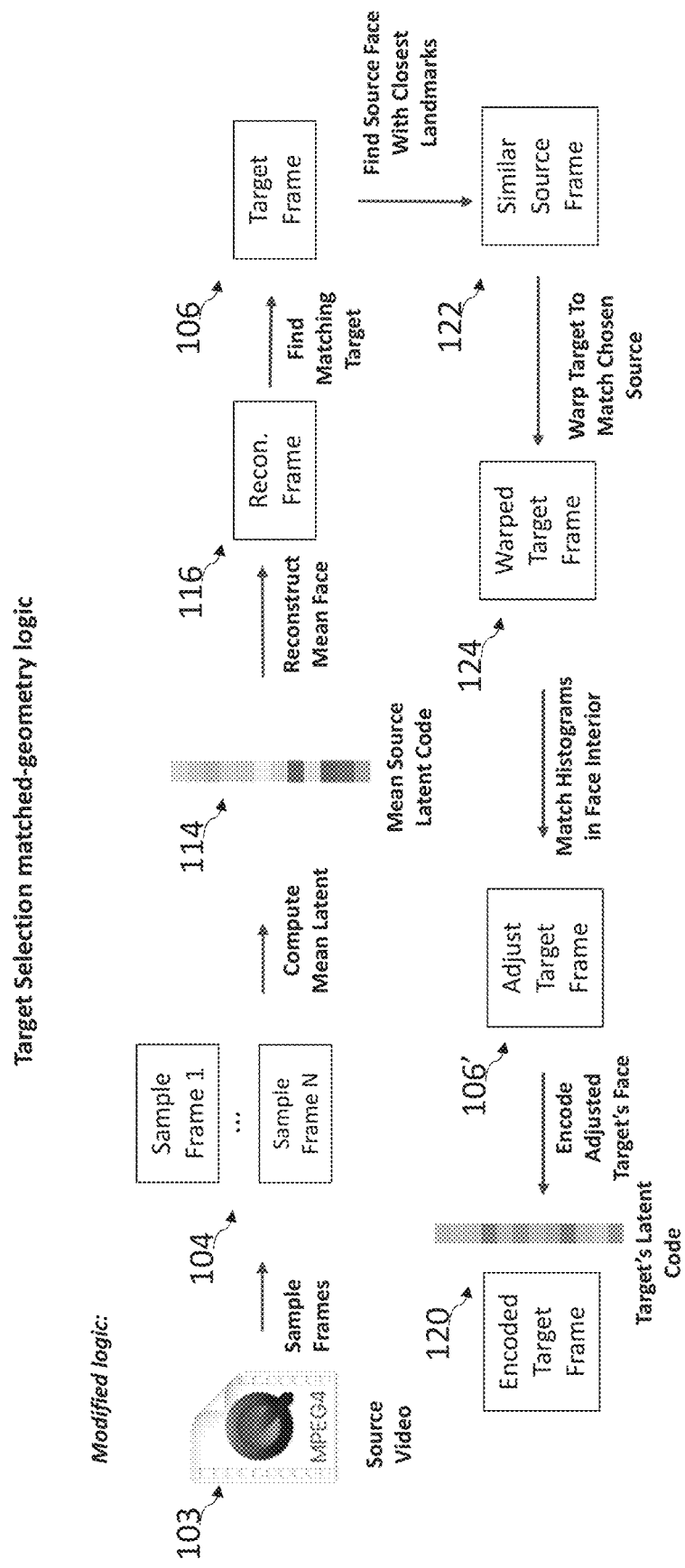
FIG. 4 schematically illustrates data structures for selecting a target anonymized image matching a source video by warping the target to match the geometry of a representative source frame using matched-geometry logic, in accordance with some embodiments of the invention.

Reference is made to FIG. 4, which schematically illustrates data structures for selecting a target anonymized image matching a source video 103 by warping the target to match the geometry of a representative source frame using matched-geometry logic, in accordance with some embodiments of the invention. In contrast to FIG. 3, the target is selected in FIG. 4 to have substantially the same geometry (e.g., facial expression) as the source, so there is no need to average the data across multiple images to cancel such geometries (e.g., facial expressions), e.g., as in FIG. 2.

After the matching target image Itrg,t 118 is selected in FIG. 3, FIG. 4 searches for a source image Isrc,t' 122 with the closest landmarks (e.g., facial geometry, expression and pose) thereto. Target image Itrg,t 118 is warped 124 to match the geometry (e.g., facial expression) of the closest source image Isrc,t' 122, which is a better match for target image Itrg,t 118 than the average of the source frames. Histograms of warped target image 124 may be altered to match those of closest source image 122 to output target image 106', for example, with lighting that better matches the source lighting. The final target image Itrg,t 106' may be encoded to generate encoded target image data Ztrg,t 120. Because target image 106' is selected to match the landmarks of the source frame, there is no need to average the encoded source or target image data across multiple frames to eliminate landmark discrepancies. For example, in facial anonymization, there is no need to average to cancel out facial expressions because the target has substantially the same facial expression as the source. Accordingly, FIG. 2 may be modified by eliminating the averaging step and defining the transformation as e.g., $T(x)=x+\Delta Z=x+(Zscr,t-Ztrg,t)$.

In various embodiments, accuracy and/or processing efficiency may be optimized by anonymizing output images resulting from selecting a target anonymized video based on (a) mean-based logic e.g., described in FIG. 3 and/or (b) matched-geometry logic e.g., described in FIG. 4. Matched-geometry logic matches frame geometry, while mean-based logic matches additional parameters that vary between the frames being processed, such as illumination, gaze, etc. Mean-based logic and matched-geometry logic may be combined, e.g., by applying mean-based logic to generate a mean-based representation, decode it, warp the geometry using matched-geometry logic, then encode it again. Combining mean-based logic and matched-geometry logic may improve the accuracy with which the anonymized identity matches the source identity, however, performing only one of these types of logic (and not the other) may result in faster processing.

A device, system or method (e.g., using one or more processor(s) or controller(s) such as 2 in FIG. 5) may execute the following operations on data structures, for example, as follows:

Input: A video or segment, V, comprising a plurality of video image frames $\{V_1, \ldots, V_N\}$, to anonymize.

Step 1: Achieve an anonymized version of one or more frames from the video:

$\{Q(V_i)\}, i$ in $S$ where $V_i$ is the i-th frame in the video V, S is a subset of frames in the video V, and Q is a frame anonymizer.

Step 2: Compute a face-swapping transformation T from $V_i$ to $Q(V_i)$.

Step 3: Apply the face-swapping transformation T computed in step 2 to each and every frame $V_i$ in V or a subset thereof.

Anonymizer Q may comprise an identity-preserving encoder, a de-identification encoder and a decoder, an autoencoder that performs a perturbation in the encoded space, a search engine that returns the nearest face (e.g., in terms of expression, colors, etc.) from a pre-computed database of facial images, or a combination thereof such as a search engine that returns the nearest face from the database that matches an image perturbed by an autoencoder.

Reference is made to FIG. 5, which schematically illustrates a system for anonymizing personal identifiable information consistently across multiple images of a source video, in accordance with some embodiments of the invention.

The system of FIG. 5 may comprise a computing device 1 that may include a controller 2 (e.g., a central processing unit (CPU) processor, a chip or any suitable computing or computational device), an operating system 3, a memory 4, executable code 5, a storage system 6, input devices 7 and/or output devices 8.

Controller 2 (e.g., one or more controllers or processors, possibly across multiple units or devices) may be configured to carry out methods described herein, and/or to execute or act as the various encoders, decoders, engines, etc. More than one computing device 1 may be included in, and one or more computing devices 1 may act as the components of, a system according to some embodiments of the invention.

Operating system 3 may be or may include any code segment (e.g., one similar to executable code 5) designed and/or configured to perform tasks or operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be, or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc.

may store data, neural networks, images, or any other data structure disclosed herein, and/or instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may anonymize a face in an image as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Storage system 6 may store data, neural networks, images, or any other data structure disclosed herein.

In some embodiments, some of the components shown in FIG. 5 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 6:
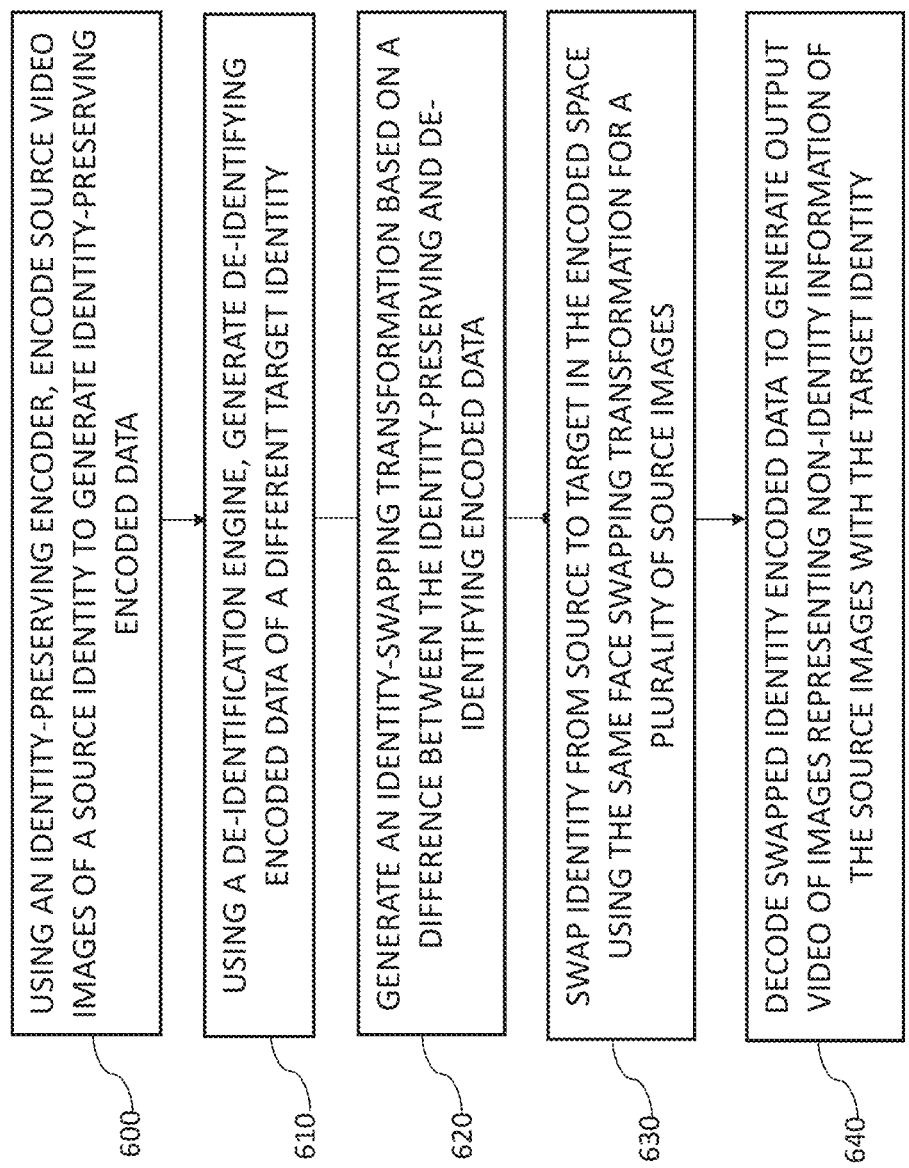
FIG. 6 is a flowchart of a method for anonymizing personal identifiable information consistently across multiple images of a source video, in accordance with some embodiments of the invention.

Reference is made to FIG. 6, which is a flowchart of a method for anonymizing personal identifiable information consistently across multiple images of a source video, in accordance with some embodiments of the invention. Operations performed in FIG. 6 may be executed by one or more devices or components from the system of FIG. 5, e.g., one or more processor(s) or controller(s) 2, or other systems, devices or components.

In operation 600, a process or processor may encode, using an identity-preserving encoder, one or more source images in a source video of a person with a source identity to generate identity-preserving encoded data representing the source identity information in the encoded space. The identity-preserving encoder may be trained with a decoder to preserve identity information unique to an individual in an encoded space. In some embodiment, the identity-preserving encoder may be a neural network trained to optimize weights of the neural network, e.g., according to equation (1).

In operation 610, a process or processor may generate, using a de-identification engine, de-identifying encoded data representing information for a target identity different than the source identity in the encoded space.

In some embodiments, the de-identification engine may include a de-identification encoder that is trained to preserve non-identity information not unique to an individual, but is not trained to, or is trained not to, preserve the identity information unique to an individual.

Additionally or alternatively, the de-identification encoder may be trained with the decoder by a neural network that is relatively low quality (e.g., having a small number of neurons, weight, layer, channels, a short training interval, sparsely connected structure, added noise during training, etc.) that result in a sufficient loss of identifying information. Additionally or alternatively, the de-identification encoder is a neural network trained to optimize weights of the neural network, e.g., according to equation (2).

Additionally or alternatively, the de-identification encoder may be trained to maximize a difference of face recognition, while minimizing a difference of image similarity.

Additionally or alternatively, the de-identification encoder may search for a target image of an anonymous person with an anonymous identity that is different than, but that most closely, matches the source identity, and encode the target image with an identity-preserving encoder to generate the de-identifying encoded data.

In some embodiments, when geometry of identifying information in the target image and source images do not match, the target image and/or the source image may be warped (see e.g., warped target image 124 of FIG. 4) to have the same or approximately similar geometry as each other. In some embodiments, when geometry of identifying information in the target image and source images do not match, the identity-preserving encoded data may be averaged for multiple source images and the de-identifying encoded data may be averaged for multiple target images in the difference. In some embodiments, the averaged de-identifying encoded data may be generated by initially decoding the averaged identity-preserving encoded data and re-encoding the decoded data with the de-identification encoder.

Additionally or alternatively, the identity-preserving encoder in operation 600 may encode multiple source images of the source video and average the encoded representation of the multiple source frames to generate the identity-preserving encoded data. The de-identification engine in operation 610 may then obtain or search for a target video of an anonymous person with an anonymous identity that is different than, but that most closely, matches the source identity, encode multiple target images of the target video with an encoder and average the encoded representation of the multiple target frames to generate the de-identifying encoded data.

Additionally or alternatively, the de-identification engine may be trained to perturb identity information unique to an individual in the encoded space.

In operation 620, a process or processor may generate an identity-swapping transformation based on a difference between the identity-preserving encoded data and the de-identifying encoded data, the difference representing the removal of the source identity information and the addition of the target identity information. In some embodiments, when geometry of identifying information in the target image and source image substantially match, the difference may use the identity-preserving encoded data for a single source image and the de-identifying encoded data for a single target image.

In operation 630, a process or processor may swap the identity from the source to the target in the encoded space by applying the same transformation to the identity-preserving encoded data for a plurality of source images causing the removal of the source identity information and the addition of the same target identity information for all of the plurality of source images.

In operation 640, a process or processor may decode the swapped identity encoded data (e.g., using the same or different decoder described in operation 600) to generate a plurality of output images representing the non-identity information from the plurality of source images and the same target identity, but not the source identity, information, for all the plurality of output images in an output video. The output video may be displayed to a user on a monitor, screen, or display device (e.g., output device 8 of FIG. 5).

In some embodiments, a process or processor may iteratively repeat operations 610-640 for swapping the identity from a first target to a second target in the encoded space by generating second de-identifying encoded data for a second target identity (operation 610), generating a second transformation for based on a new difference (operation 620), applying that second transformation to swap the first target identity information for the second target identity information for all of the plurality of source images (operation 630), and/or decoding the new second identity video (operation 640). A chain or sequence of any number of identity swaps may be executed in a sequence of respective iterations of operations 610-640, where in each subsequent iteration, the target identity of the previous iteration is reset to be the source identity of the subsequent iteration.

Other operations or orders of operations may be used. For example, operations 600-640 may be executed in parallel or in series for each single or group of multiple source images in the source video.

When used herein, "anonymize" may refer to the removal or reduction of personal identifiable information or features unique to an individual, e.g., related to their face, hand, body, or other identifiable part of a person. Anonymization may remove or reduce the identifiable information unique to the individual while preserving attributes common to a group of class of people, such as gender, ethnicity, hair color, and age, to form a person with a similar look (but not identifiable as the original individual). Anonymization may be applied to de-identify individuals in video, for example, to conform to privacy laws.

A identity-preserving may refer to an encoder that is trained to ideally preserve all or a maximal amount of specific identifying information unique to an individual, such as facial landmarks, biometric data, etc. that are used to identify a particular individual. A de-identification encoder may refer to an encoder that is trained to preserve some non-identifying attributes (not unique to an individual, such as hair color), but not the aforementioned identifying attributes unique to an individual. Additionally or alternatively, identity-preserving and de-identification encoders may refer to relative measures, such that identity-preserving encoder preserves significantly more and de-identification encoder preserves significantly less of the specific identifying information unique to an individual, compared to each other.

While the foregoing description refers to swapping a real person's source identity to a different synthetic target identity, embodiments of the invention also apply to swapping a first real identity to a second different real identity. The second real identity may be an approved identity to which access or privacy rights are granted.

When used herein, video V may refer to a full video or a partial video (a continuous chronological segment of a full video).

"Consistent" appearance may refer to the appearance of a single or same person, although the precise face may change (e.g., by facial expressions, positioning, field of view, perspective, etc.).

The term neural network (NN), e.g., a neural network implementing machine learning, may be used herein to refer to an information processing structure that may include nodes, referred to as neurons, organized into layers, with links between the neurons. The links may transfer information between neurons and may be associated with weights. A NN may be configured or trained for a specific task, e.g., de-identification. Training a NN for the specific task may involve adjusting these weights based on examples in a training dataset. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device, may perform the relevant calculations.

While the foregoing description primarily discusses anonymizing faces, the disclosed embodiments of the invention apply equally to anonymizing any personal identifiable information, including, but not limited to, faces, hands, fingerprints, eyes, bodies, voices, or any other body part unique to an individual.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart illustrates the architecture, functionality, and operation of possible implementations of systems and methods according to various embodiments of the present invention. In this regard, each block in the flowchart may represent a segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the flowchart, and combinations of blocks in the flowchart, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., one or more memories 4 of FIG. 5), a disk drive, or a USB flash memory, encoding, including or storing instructions, e.g., computer-executable instructions, which, when executed by a processor or controller (e.g., one or more processor(s) or controller(s) 2 of FIG. 5), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

Devices or components ending in a parenthetical plurality "(s)" may indicate that the plurality is optional and so, cover both the option of a single such device or component or a plurality of (multiple) such devices or components.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

The invention claimed is:

1. A method for consistently anonymizing a source video comprising:

using an identity-preserving encoder, trained with a decoder to preserve identity information unique to an individual in an encoded space, encoding one or more source images in a source video of a person with a source identity to generate identity-preserving encoded data representing the source identity information in the encoded space;

using a de-identification engine, generating de-identifying encoded data representing information for a target identity different than the source identity in the encoded space, wherein the de-identification engine includes a de-identification encoder that is trained to preserve non-identity information not unique to an individual, but is not trained to, or is trained not to, preserve the identity information unique to an individual, wherein the de-identification encoder is a neural network trained to optimize weights of the neural network as:

$$w' = \mathrm{argmin}_w \sum_x d(A(D(E_w(x))) - A(x))$$

where x is an input image, $E_w$ is an encoder with a set of candidate weights w, A is a non-identifying attribute function, and d is a difference function;

generating a transformation based on a difference between the identity-preserving encoded data and the de-identifying encoded data, the difference representing the removal of the source identity information and the addition of the target identity information;

swapping the identity from the source to the target in the encoded space by applying the same transformation to the identity-preserving encoded data for a plurality of source images causing the removal of the source identity information and the addition of the same target identity information for all of the plurality of source images; and decoding the swapped identity encoded data to generate a plurality of output images representing the non-identity information from the plurality of source images and the same target identity, but not the source identity, information, for all the plurality of output images in an output video.

2. The method of claim 1 comprising training the de-identification encoder with the decoder by a neural network that results in a sufficient loss of identifying information.

3. The method of claim 1 comprising using the de-identification engine to search a database of pre-computed anonymous target images for a target image of an anonymous person with an anonymous identity that is different than, but that, based on smallest difference algorithm or a machine learning to match identities, most closely matches the source identity, and encode the target image with an identity-preserving encoder to generate the de-identifying encoded data.

4. The method of claim 3, wherein when geometry of identifying information in the target image and source image substantially match, comprising using the identity-preserving encoded data for a single source image and the de-identifying encoded data for a single target image in the difference.

5. The method of claim 3, wherein when geometry of identifying information in the target image and source images do not match, comprising warping the target image or the source image to have the same or approximately similar geometry as each other.

6. The method of claim 3, wherein when geometry of identifying information in the target image and source images do not match, comprising averaging the identity-preserving encoded data for multiple source images and averaging the de-identifying encoded data for multiple target images in the difference.

7. The method of claim 6 comprising generating the averaged de-identifying encoded data by initially decoding the averaged identity-preserving encoded data and re-encoding the decoded data with the de-identification encoder.

8. The method of claim 1 comprising:
  encoding, using the identity-preserving encoder, multiple source images of the source video and averaging the encoded representation of the multiple source frames to generate the identity-preserving encoded data; and
  using the de-identification engine to obtain or search a database of pre-computed anonymous target images for a target video of an anonymous person with an anonymous identity that is different than, but that, based on smallest difference algorithm or a machine learning to match identities, most closely matches the source identity, encode multiple target images of the target video with an encoder and average the encoded representation of the multiple target frames to generate the de-identifying encoded data.

9. The method of claim 1 comprising training the de-identification engine to perturb identity information unique to an individual in the encoded space.

10. The method of claim 1 comprising iteratively repeating swapping the identity from a first target to a second target in the encoded space by applying a new difference for each identity swap to cause the removal of the first target identity information and the addition of the second target identity information for all of the plurality of source images.

11. A method for consistently anonymizing a source video comprising:
  using an identity-preserving encoder, trained with a decoder to preserve identity information unique to an individual in an encoded space, encoding one or more source images in a source video of a person with a source identity to generate identity-preserving encoded data representing the source identity information in the encoded space;
  using a de-identification engine, generating de-identifying encoded data representing information for a target identity different than the source identity in the encoded space,
  wherein the de-identification engine includes a de-identification encoder that is trained to preserve non-identity information not unique to an individual, but is not trained to, or is trained not to, preserve the identity information unique to an individual,
  wherein the identity-preserving encoder is a neural network trained to optimize weights of the neural network as:

$$w' = \mathrm{argmin}_w \sum_x d(D(E_w(x)) - x)$$

where x is an input image, $E_w$ is an encoder with a set of candidate weights w, and d is a difference function.

12. A system for consistently anonymizing a source video, comprising:
  one or more memories to store a source video comprising a plurality of source images of a person with a source identity; and
  one or more processors configured to:
    execute an identity-preserving encoder and decoder trained to preserve identity information unique to an individual in an encoded space, the identity-preserving encoder executed to encode one or more of the source images in the source video of the person with a source identity to generate identity-preserving encoded data representing the source identity information in the encoded space,
    wherein the de-identification engine includes a de-identification encoder that is trained to preserve non-identity information not unique to an individual, but is not trained to, or is trained not to, preserve the identity information unique to an individual,
    wherein the de-identification encoder is a neural network trained to optimize weights of the neural network as:

$$w' = \mathrm{argmin}_w \sum_x d(D(E_w(x)) - x)$$

where x is an input image, $E_w$ is an encoder with a set of candidate weights w, A is a non-identifying attribute function, and d is a difference function,
    execute a de-identification engine to generate de-identifying encoded data representing information for a target identity different than the source identity in the encoded space,
    compute a transformation based on a difference between the identity-preserving encoded data and the de-identifying encoded data, the difference representing the removal of the source identity information and the addition of the target identity information,
    swap the identity from the source to the target in the encoded space by applying the same transformation to the identity-preserving encoded data for a plurality of source images causing the removal of the source identity information and the addition of the same target identity information for all of the plurality of source images, and
    execute the decoder to decode the swapped identity encoded data to generate a plurality of output images representing the non-identity information from the plurality of source images and the same target identity, but not the source identity, information, for all the plurality of output images in an output video.

13. The system of claim 12, wherein the de-identification encoder is trained with the decoder by a neural network that results in a sufficient loss of identifying information.

14. The system of claim 12, wherein the de-identification engine is executed to search a database of pre-computed anonymous target images for a target image of an anonymous person with an anonymous identity that is different than, but that, based on smallest difference algorithm or a machine learning to match identities, most closely matches the source identity, and encode the target image with an identity-preserving encoder to generate the de-identifying encoded data.

15. The system of claim 12, wherein the one or more processors are configured to:
  execute the identity-preserving encoder to encode multiple source images of the source video and average the encoded representation of the multiple source frames to generate the identity-preserving encoded data, and execute the de-identification engine to obtain or search a database of pre-computed anonymous target images for a target video of an anonymous person with an anonymous identity that is different than, but that, based on smallest difference algorithm or a machine learning to match identities, most closely matches the source identity, encode multiple target images of the target video with an encoder and average the encoded representation of the multiple target frames to generate the de-identifying encoded data.

\* \* \* \* \*